US008294413B2

United States Patent
Dai et al.

(10) Patent No.: US 8,294,413 B2
(45) Date of Patent: Oct. 23, 2012

(54) INDUCTION MOTOR CONTROL SYSTEMS AND METHODS

(75) Inventors: Min Dai, Torrance, CA (US); Bon Ho Bae, Torrance, CA (US); Leah Dunbar, Manhattan Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 366 days.

(21) Appl. No.: 12/652,448

(22) Filed: Jan. 5, 2010

(65) Prior Publication Data

US 2011/0163709 A1   Jul. 7, 2011

(51) Int. Cl.
*H02P 23/00* (2006.01)
*H02P 27/00* (2006.01)

(52) U.S. Cl. ......... 318/812; 318/807; 318/808; 318/810

(58) Field of Classification Search .......... 318/807, 318/808, 810, 812
See application file for complete search history.

(56) References Cited

U.S. PATENT DOCUMENTS

| | | | | |
|---|---|---|---|---|
| 6,788,024 | B2 * | 9/2004 | Kaneko et al. | 318/807 |
| 7,385,371 | B2 * | 6/2008 | Kitanaka | 318/727 |
| 2001/0002784 | A1 * | 6/2001 | Masaki et al. | 318/727 |
| 2004/0051495 | A1 * | 3/2004 | Kaneko et al. | 318/807 |
| 2007/0159131 | A1 * | 7/2007 | Kitanaka | 318/807 |
| 2010/0066283 | A1 * | 3/2010 | Kitanaka | 318/400.02 |

* cited by examiner

*Primary Examiner* — Walter Benson
*Assistant Examiner* — Gabriel Agared
(74) *Attorney, Agent, or Firm* — Ingrassia Fisher & Lorenz, P.C.

(57) ABSTRACT

A control system is provided for an inverter assembly associated with an induction motor. The system includes a current determination module configured to generate q- and d-axis current commands based on a torque command. The current determination module is further configured to generate the q-axis current command based on an observed flux linkage and a flux linkage command. The system further includes a motor current control module coupled to the current determination module and configured to generate q- and d-axis voltage commands based on the q- and d-axis current commands generated by the current determination module and a PWM modulator coupled to the motor current control module configured to generate duty cycle signals for operating the inverter assembly based on the q- and d-axis voltage commands generated by the motor current control module.

17 Claims, 3 Drawing Sheets

INDUCTION MOTOR CONTROL SYSTEMS AND METHODS

TECHNICAL FIELD

The present invention generally relates to induction motors, and more particularly relates to systems and methods for controlling induction motors found in hybrid vehicles and other applications.

BACKGROUND

In recent years, advances in technology, as well as evolving tastes in style, have led to substantial changes in the design of automobiles. One of the changes involves the power usage and complexity of the various electrical systems within automobiles, particularly alternative fuel vehicles, such as hybrid, electric, and fuel cell vehicles. Many of these vehicles use electric motors, such as induction motors, to convert electrical power to mechanical power to provide traction power to the vehicle.

Motor vehicle applications typically employ a three-phase AC induction motor. In an induction motor, a stator includes a number of wound poles carrying supply current to induce a magnetic field that penetrates the rotor. Typically, an electronic control system generates duty cycle commands based on the torque commanded by the driver and measured system quantities. Based on the duty cycle commands, an inverter assembly then applies an appropriate voltage to produce current commands for the induction motor.

The electronic control system typically commands both d- and q-axis currents. In particular, the d-axis current command is generated based on a d-axis flux linkage command derived from the torque command and current operating conditions. Some conventional systems may have a delay between the torque command and the actual torque response. Particularly, during transient time periods, the true d-axis flux linkage changes slower than the d-axis current on which it is built as a result of the inherent rotor time constant of the motor, which may cause the torque delays.

Accordingly, it is desirable to have improved control systems and methods that reduce torque delay in induction motors. Furthermore, other desirable features and characteristics of the present invention will become apparent from the subsequent detailed description and the appended claims, taken in conjunction with the accompanying drawings and the foregoing technical field and background.

BRIEF SUMMARY

In accordance with an exemplary embodiment, a control system is provided for an inverter assembly associated with an induction motor. The system includes a current determination module configured to generate q- and d-axis current commands based on a torque command. The current determination module is further configured to generate the q-axis current command based on an observed flux linkage and a flux linkage command. The system further includes a motor current control module coupled to the current determination module and configured to generate q- and d-axis voltage commands based on the q- and d-axis current commands generated by the current determination module and a PWM modulator coupled to the motor current control module configured to generate duty cycle signals for operating the inverter assembly based on the q- and d-axis voltage commands generated by the motor current control module.

In accordance with an exemplary embodiment, a method is provided for controlling an inverter of an induction motor. The method includes receiving a torque command; generating a flux linkage command based on the torque command; receiving an observed flux linkage; generating a q-axis current command a based on the flux linkage command and the observed flux linkage; generating a d-axis current command based on the flux linkage command; generating q- and d-axis voltage commands based on the q- and d-axis current command; and generating duty cycle signals for operating the inverter based on the q- and d-axis voltage commands.

DESCRIPTION OF THE DRAWINGS

The present invention will hereinafter be described in conjunction with the following drawing figures, wherein like numerals denote like elements, and wherein.

DETAILED DESCRIPTION OF EXEMPLARY EMBODIMENTS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Broadly, exemplary embodiments disclosed herein relate to a control system for an inverter assembly of an induction motor. The control system uses a dynamic Iq control to reduce torque delay, particularly during transient time periods. In one exemplary embodiment, the control system modifies the q-axis current command with a scaling factor selected based on observed and command flux linkages.

Figure 1:
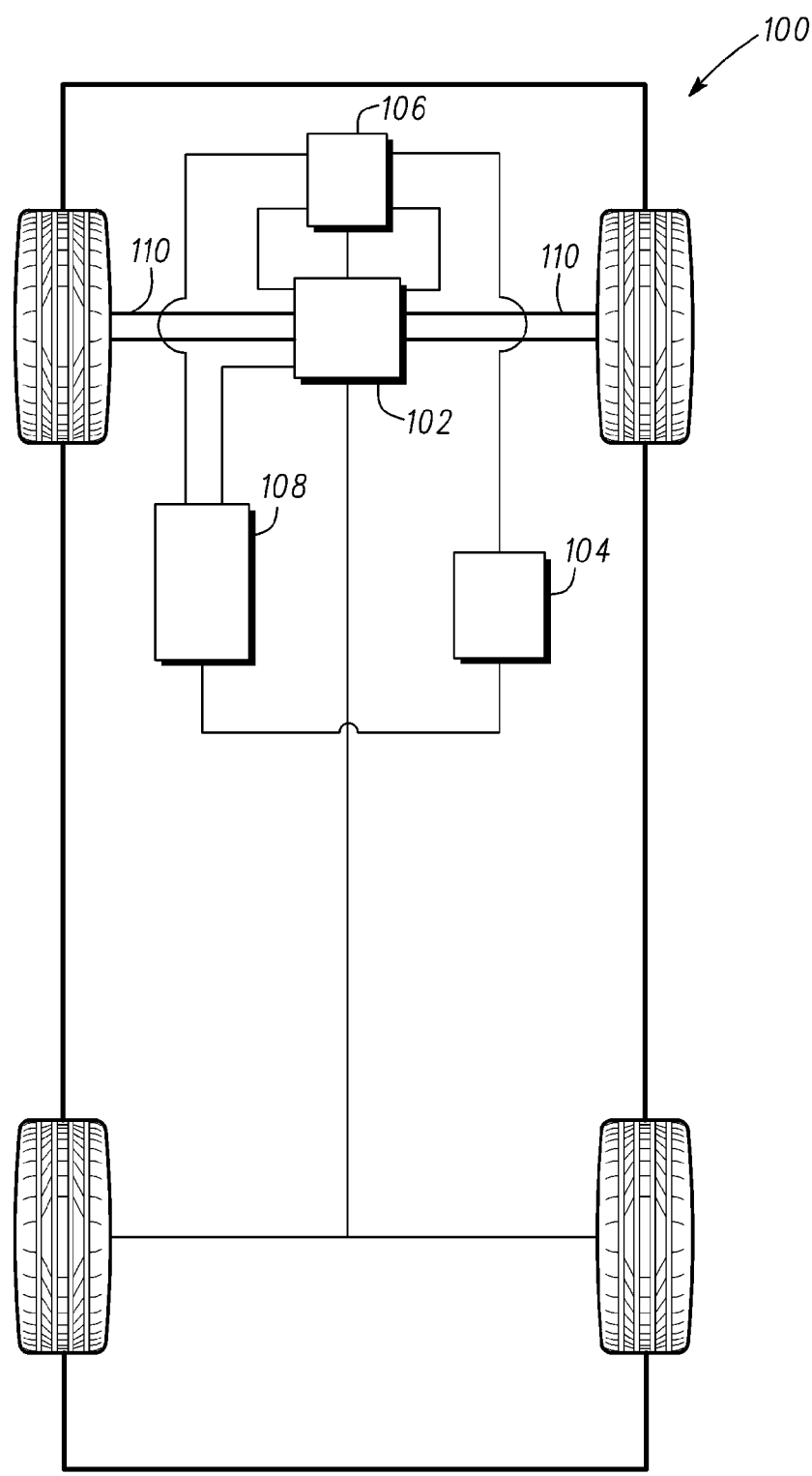
FIG. 1 is a schematic view of an exemplary automobile that includes an induction motor control system in accordance with an exemplary embodiment.

FIG. 1 illustrates a vehicle, or automobile 100, in accordance with an exemplary embodiment, which includes an induction motor 102, an energy source 104, an inverter assembly 106, an electronic control system 108, and a drive shaft 110. In an exemplary embodiment, the energy source 104 is in operable communication and/or electrically coupled to the control system 108 and the inverter assembly 106. The inverter assembly 106 is coupled to the induction motor 102, which in turn is coupled to the drive shaft 110. The inverter assembly 106 is in operable communication and/or electrically coupled to the control system 108 and is configured to provide electrical energy and/or power from the energy source 104 to the induction motor 102 as discussed in greater detail below.

Depending on the embodiment, the automobile 100 may be any one of a number of different types of automobiles, such as, for example, a motorcycle, a scooter, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 100 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a fuel cell vehicle engine, a gaseous compound (e.g., hydrogen and natural gas) fueled engine, a combustion/electric motor hybrid engine, or an electric motor.

In the exemplary embodiment illustrated in FIG. 1, the induction motor 102 may comprise a generator, a traction motor, or another suitable motor known in the art. The induction motor 102 may be a multi-phase alternating current (AC) motor and include a set of windings (or coils) that each correspond to one phase of the induction motor 102. Although not illustrated in FIG. 1, the induction motor 102 includes a stator assembly (or stator) and a rotor assembly (or rotor), as will be appreciated by one skilled in the art. In an exemplary embodiment, the induction motor 102 may also include a transmission integrated therein such that the induction motor 102 and the transmission are mechanically coupled to at least some of the wheels through the drive shafts 110.

Depending on the embodiment, the energy source 104 may comprise a battery, a fuel cell, or another suitable voltage source. It should be understood that although FIG. 1 depicts an automobile 100 having one energy source 104, the principles and subject matter discussed herein are independent of the number or type of energy source, and apply to vehicles having any number of energy sources.

In an exemplary embodiment, the inverter assembly 106 includes one or more inverters, each including switches with antiparallel diodes. In various embodiments, the switches are implemented with insulated gate bipolar transistors (IGBTs), metal oxide semiconductor field effect transistors (MOSFETs), and/or the like. The windings of the induction motor 102 are electrically connected between the switches to provide voltage and create torque in the induction motor 102.

As noted above, the control system 108 is in operable communication and/or electrically coupled to the inverter assembly 106. In general, the control system 108 may be any device, module, circuitry, logic and/or the like capable of providing control signals to the various components of inverter assembly 106. The control system 108 may also includes various sensors and automotive control modules, and may further include a processor and/or a memory which includes instructions stored thereon (or in another computer-readable medium) for carrying out the processes and methods as described below. In particular, the control system 108 is responsive to commands received from the driver of the automobile 100 (i.e. via an accelerator pedal) and provides commands to the inverter assembly 106 to utilize high frequency pulse width modulation (PWM) to manage the voltage provided to the induction motor 102 by the inverter assembly 106. In an exemplary embodiment, the control system 108 implements dynamic Iq control to improve torque response of the induction motor 102, particularly during transient time periods, as described in greater detail below.

Figure 2:
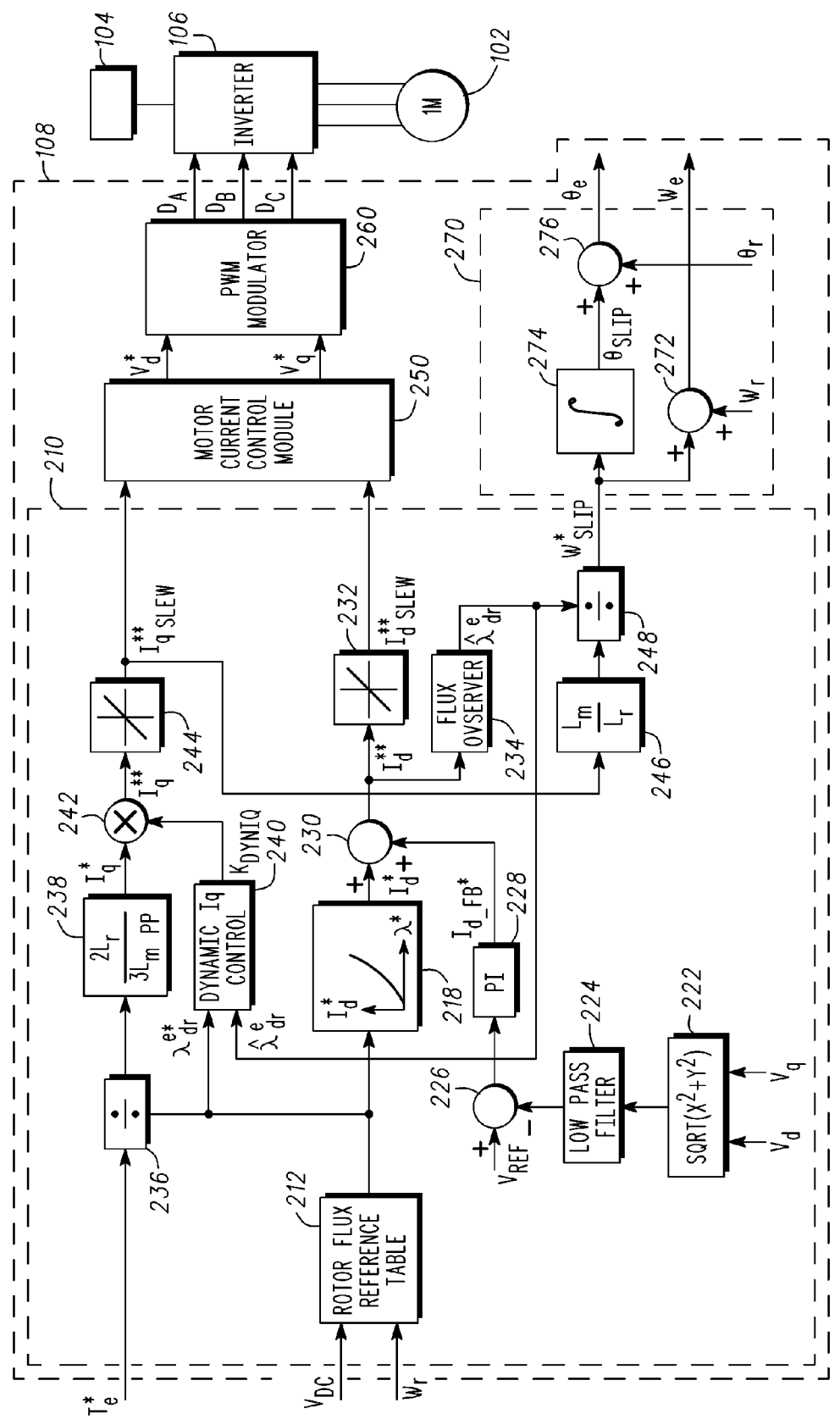
FIG. 2 is a schematic block diagram of the exemplary control system of FIG. 1.

FIG. 2 is a schematic block diagram showing the control system 108 in greater detail. As noted above, the energy source 104 is coupled to the inverter assembly 106, which in turn is coupled to the induction motor 102. The control system 108 is coupled to the inverter assembly 106, and is configured to provide duty cycle commands to the inverter assembly 106.

In an exemplary embodiment, the control system 108 includes a current determination module 210, a motor current control module 250, a PWM modulator 260, and a motor speed position module 270. The control system 108 may additionally include other modules for controlling other aspects of the induction motor 102 and the automobile 100 (FIG. 1). As used herein, subscripts d and q are quantities in the Cartesian frame of reference synchronous with the rotation of a rotor within an induction motor, where the q-axis (or quadrature axis) is orthogonal to the rotor pole axis (i.e., torque generating) and the d-axis (or direct axis) is parallel to the rotor pole axis (i.e., non-torque generating).

As shown in FIG. 2, the current determination module 210 receives a torque command ($T_e^*$), which is an indication of the amount of torque demanded from the induction motor 102 and may be provided, for example, by the driver. Initially, a rotor flux reference table 212 indicates a d-axis flux linkage command ($\lambda^{e*}_{dr}$) based on the voltage of the energy source 104 ($V_{DC}$) and the rotor speed ($\omega_r$) of the induction motor 102. The rotor speed ($\omega_r$) and voltage ($V_{DC}$) may be provided by, for example, sensors or any suitable determination.

For the d-axis, the d-axis flux linkage command ($\lambda^{e*}_{dr}$) is an input to a current table 218 that indicates a d-axis current command ($I_d^*$) corresponding to the d-axis flux linkage command ($\lambda^{e*}_{dr}$). Referring now to processing block 222, the square root of the sum of the squares of d-axis and q-axis voltages ($V_d, V_q$) are provided to a low pass filter element 224. The d-axis and q-axis voltages ($V_d, V_q$) may be provided, for example, by a motor current control module 250, which is discussed in further detail below. The output of the low pass filter element 224 is subtracted from a reference voltage ($V_{REF}$) in a difference element 226, the result of which is input into a proportional integral (PI) regulator 228 to produce a feedback d-axis current command ($I_{d\_FB}^*$). In summation element 230, the sum of the feedback d-axis current command ($I_{d\_FB}^*$) from the PI regulator 228 and the d-axis current command ($I_d^*$) from the current table 218 produces a modified d-axis current command ($I_d^{}$). The modified d-axis current command ($I_d^{}$) is provided as an input to a slew rate limiter 232 that limits the rate of change of the d-axis current to produce a d-axis current command output value ($I_d^{**}{}_{slew}$).

The modified d-axis current command ($I_d^{**}$) from element 230 is also provided to a flux observer element 234 to produce an observed d-axis flux linkage ($\hat{\lambda}^e_{dr}$). The observed d-axis flux linkage ($\hat{\lambda}^e_{dr}$) will be discussed in greater detail below.

For the q-axis, the torque command ($T_e^*$) is divided by the d-axis flux linkage command ($\lambda^{e*}_{dr}$) in divider element 236 and then, in processing element 238, multiplied by $2L_r/(3L_m PP)$ to produce a q-axis current command ($I_q^*$), where $L_r$ is the self-inductance of the induction motor rotor, $L_m$ is the mutual inductance between the stator and rotor in the induction motor, and PP is the number of pole pairs. Elements 236, 238 generally correspond to torque equation (1) listed below:

$$T = \frac{3}{2} PP \frac{L_m}{L_r} \lambda^e_{dr} i^e_{qs}, \quad (1)$$

In accordance with an exemplary embodiment, the q-axis current command ($I_q^*$) is modified by a scaling factor (K) from dynamic Iq control element 240. As discussed in greater detail below, the scaling factor improves torque response of the induction motor 102. In any event, the dynamic Iq control element 240 receives the d-axis flux linkage command ($\lambda^{e*}_{dr}$) from element 216 and the observed d-axis flux linkage ($\hat{\lambda}^e_{dr}$) from the flux observer element 234. The dynamic Iq control element 240 includes predetermined $K_{max}$ and $K_{min}$ values. The $K_{max}$ and $K_{min}$ values may be determined and adjusted empirically and experimentally to achieve satisfactory dynamic torque responses under various operating conditions. If the ratio of the d-axis flux linkage command ($\lambda^{e*}_{dr}$) to the observed d-axis flux linkage ($\hat{\lambda}^e_{dr}$) is greater than $K_{max}$, the dynamic Iq control element 240 outputs $K_{max}$ as the scaling factor (K). If the ratio of the d-axis flux linkage command ($\lambda^{e*}_{dr}$) to the observed d-axis flux linkage ($\hat{\lambda}^{e}_{dr}$) is between $K_{min}$ and $K_{max}$, the dynamic Iq control element 240 outputs the value of the ratio as the scaling factor (K). During steady state, this ratio may have a value of approximately one. Finally, if the ratio of the d-axis flux linkage command ($\lambda^{e*}_{dr}$) to the observed d-axis flux linkage ($\hat{\lambda}^{e}_{dr}$) is less than $K_{min}$, the dynamic Iq control element 240 outputs $K_{min}$ as the scaling factor (K). Accordingly, the dynamic Iq control element algorithm can be summarized as follows in equation (2):

$$K_{DynIq} = \begin{cases} K_{max}, \text{ if } \frac{\lambda^{e*}_{dr}}{\hat{\lambda}^{e}_{dr}} > K_{max} \\ \frac{\lambda^{e*}_{dr}}{\hat{\lambda}^{e}_{dr}}, \text{ else} \\ K_{min}, \text{ if } \frac{\lambda^{e*}_{dr}}{\hat{\lambda}^{e}_{dr}} < K_{min} \end{cases} \quad (2)$$

The q-axis current command ($I_q^*$) is multiplied by the scaling factor (K) in element 242 to produce a modified q-axis current command ($I_q^{}$). The modified d-axis current command ($I_q^{}$) is an input to a slew rate limiter 244 that limits the rate of change of the q-axis current to produce a q-axis current command output value ($I_q^{**}_{slew}$).

Referring now to element 246 and element 246, the q-axis current command output value ($I_q^{}_{slew}$) from limiter 244 is multiplied by $L_r/L_m$ in processing element 246 and the resulting output is divided into the estimated d-axis flux linkage ($\hat{\lambda}^{e}_{dr}$) in division element 248** to produce a command rotor slip speed ($\omega^*_{slip}$) which is output to the motor speed position module 270.

The motor speed position module 270, in summation element 272, adds the command rotor slip speed ($\omega^*_{slip}$) to the rotor speed ($\omega_r$) to produce an electrical rotor speed unit ($\omega_e$). Additionally, motor speed position module 270, in element 274, integrates the command rotor slip speed ($\omega^*_{slip}$) to produce a rotor slip angle ($\Theta_{slip}$) which is then added to relative rotor angle ($\Theta_r$) in element 276 to produce an electrical angle unit of the rotational position ($\Theta_e$).

The motor current control module 250 receives the q-axis current command output value ($I_q^{}_{slew}$) and d-axis current command output value ($I_d^{}_{slew}$) as inputs to produce q-axis voltage commands ($V_q^*$) and d-axis voltage commands ($V_d^*$). The PWM modulator 260 receives q-axis voltage commands ($V_q^*$) and d-axis voltage commands ($V_d^*$) and produces the duty cycle commands ($D_A$, $D_B$, $D_C$) to the inverter assembly 106. Using the duty cycle commands ($D_A$, $D_B$, $D_C$), the inverter assembly 106 produces three-phase AC voltages (e.g., $V_a$, $V_b$, $V_c$) from a supply potential (e.g., a battery potential or DC bus voltage ($V_{dc}$)) and drives the induction motor 102 with the three-phase voltages.

Accordingly, in exemplary embodiments, the control system 108 implements dynamic Iq control to improve torque response of the induction motor 102. In conventional control systems, the torque response may be delayed as a result of the inherent rotor time constant, which may be expressed as $\tau_r = L_r/r_r$. The relationship between observed flux linkage and current may be expressed as follows in Equation (3).

$$\lambda^{e}_{dr} = \frac{L_m}{1 + \tau_r s} i^{e}_{ds} \quad (3)$$

As noted above in Equation (1), a delayed response in flux linkage ($\lambda^{e*}_{dr}$) results in a delayed torque response. This torque delay may be lower at high torques/current ranges, due to the rotor time constant $\tau_r$ decreasing with $L_r$ as saturation occurs. However, the response in conventional control systems may be slower at low torques/current ranges, i.e., a higher rotor time constant $\tau_r$ results in a lower flux linkage ($\lambda^{e*}_{dr}$).

Figure 3:
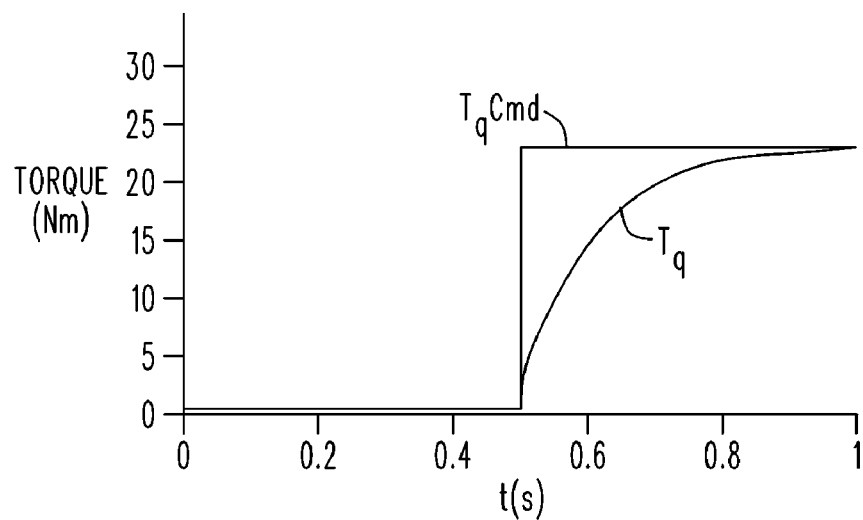
FIG. 3 is a graph illustrating commanded and observed torque over time using a conventional control system.
Figure 4:
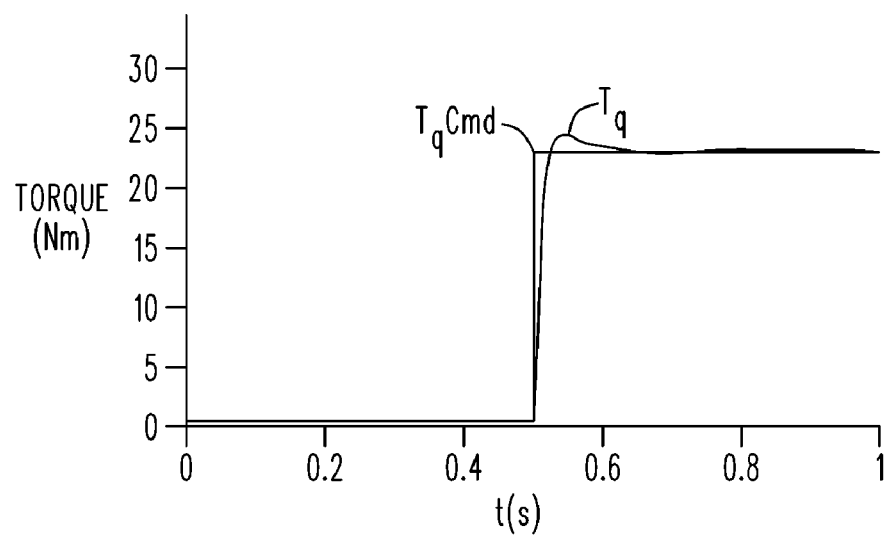
FIG. 4 is a graph illustrating commanded and observed torque over time using the exemplary control system of FIG. 2.

A comparison between the conventional and exemplary control systems are shown in FIGS. 3 and 4. FIG. 3 is a graph illustrating commanded and observed torque over time using a conventional control system; and FIG. 4 is a graph illustrating commanded and observed torque over time using the control system of FIG. 2. In each of FIGS. 3 and 4, the torque command jumps to a target torque in about 0.5 seconds. As shown in FIG. 3, the induction motor associated with the conventional control system, does not reach the target torque until approximately 1 second. In contrast, as shown in FIG. 4, the induction motor associated with the electronic control system described above reaches the target torque much faster, less than 0.1 second after the torque command. In exemplary embodiments, these test scenarios hold true at low, medium, and high speeds (e.g., 0, 4095, and 8190 rpm) and low and high torque transients (e.g., 0-10% and 0-100%) in both step up and step down.

For the sake of brevity, conventional techniques related to AC motors, AC motor control schemes, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Embodiments of the invention having been described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of electric motor applications and that the system described herein is merely one example embodiment of the invention. Equivalent concepts, however, may be readily applied in other vehicular, industrial, aerospace and/or other settings. Indeed, the various concepts described herein may be readily adapted to any modulated inverter system whatsoever.

While several exemplary embodiments have been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A control system for an inverter assembly associated with an induction motor, the system comprising:
   a current determination module configured to generate q- and d-axis current commands based on a torque command, wherein the current determination module is further configured to generate the q-axis current command based on an observed flux linkage and a flux linkage command;
   a motor current control module coupled to the current determination module and configured to generate q- and d-axis voltage commands based on the q- and d-axis current commands generated by the current determination module; and
   a PWM modulator coupled to the motor current control module configured to generate duty cycle signals for operating the inverter assembly based on the q- and d-axis voltage commands generated by the motor current control module,
   wherein the current determination module configured to generate the q-axis current command based on a ratio of the flux linkage command and the observed flux linkage such that transient torque response of the motor is reduced.

2. The control system of claim 1, wherein the current determination module is configured to generate the q-axis current command based on a scaling factor.

3. The control system of claim 2, wherein the current determination module is configured to determine the scaling factor based on the flux linkage command and the observed flux linkage.

4. The control system of claim 3, wherein the current determination module is configured to select the scaling factor based on the ratio of the flux linkage command and the observed flux linkage.

5. The control system of claim 4, wherein the current determination module is configured to select a first scaling factor if the ratio of the flux linkage command and the observed flux linkage is greater than the first scaling factor.

6. The control system of claim 5, wherein the current determination module is configured to select a second scaling factor if the ratio of the flux linkage command and the observed flux linkage is less than the second scaling factor.

7. The control system of claim 6, wherein the current determination module is configured to select a third scaling factor if the ratio of the flux linkage command and the observed flux linkage is between the first and second scaling factors.

8. The control system of claim 7, wherein the third scaling factor has a value of approximately one.

9. The control system of claim 1, wherein the current determination module is configured to generate the q-axis current command by modifying a calculated q-axis current command with a scaling factor.

10. The control system of claim 9, wherein the current determination module is configured to modify the calculated q-axis current command with the scaling factor during transient time periods.

11. A method of controlling an inverter of an induction motor, the method comprising the steps of:
    receiving a torque command;
    generating a flux linkage command based on the torque command;
    receiving an observed flux linkage;
    generating a q-axis current command a based on the flux linkage command and the observed flux linkage;
    generating a d-axis current command based on the flux linkage command;
    generating q- and d-axis voltage commands based on the q- and d-axis current command; and
    generating duty cycle signals for operating the inverter based on the q- and d-axis voltage commands,
    wherein the generating the q-axis current command step includes generating the q-axis current command based on a scaling factor, and
    wherein the generating the q-axis current command step includes selecting the scaling factor based on the ratio of the flux linkage command and the observed flux linkage.

12. The method of claim 11, wherein the selecting step includes selecting a first scaling factor if the ratio of the flux linkage command and the observed flux linkage is greater than the first scaling factor.

13. The method of claim 12, wherein the selecting step includes selecting a second scaling factor if the ratio of the flux linkage command and the observed flux linkage is less than the second scaling factor.

14. The method of claim 13, wherein the selecting step includes selecting a third scaling factor if the ratio of the flux linkage command and the observed flux linkage is between the first and second scaling factors.

15. The method of claim 14, wherein the third scaling factor has a value of approximately one.

16. The method of claim 11, wherein the generating the q-axis current command step includes modifying a calculated q-axis current command with the scaling factor during transient time periods.

17. A control system for an inverter of an induction motor, the control system comprising:
    a current determination module configured to generate q- and d-axis current commands based on a torque command, wherein the current determination module is further configured to generate the q-axis current command by modifying a calculated q-axis current command with a scaling factor based on the ratio of the flux linkage command to the observed flux linkage,
    wherein the current determination module is configured to select a first scaling factor if the ratio of the flux linkage command to the observed flux linkage is greater than the first scaling factor, a second scaling factor if the ratio of the flux linkage command to the observed flux linkage is less than the second scaling factor, and a third scaling factor if the ratio if the ratio of the flux linkage command to the observed flux linkage is between the first and second scaling factors;
    a motor current control module coupled to the current determination module and configured to generate q- and d-axis voltage commands based on the q- and d-axis current commands generated by the current determination module; and
    a PWM modulator coupled to the motor current control module configured to generate duty cycle signals for operating the inverter based on the q- and d-axis voltage commands generated by the motor current control module.

* * * * *